United States Patent [19]

Yamazaki

[11] Patent Number: 4,986,470
[45] Date of Patent: Jan. 22, 1991

[54] FLOW CONTROLLER

[75] Inventor: Tsutomu Yamazaki, Kawanishi, Japan

[73] Assignee: Hanano Commercial Co., Ltd., Kobe, Japan

[21] Appl. No.: 449,397

[22] Filed: Dec. 7, 1989

Related U.S. Application Data

[63] Continuation of Ser. No. 184,864, Apr. 22, 1988, abandoned.

[30] Foreign Application Priority Data

Apr. 24, 1987 [JP] Japan .................................. 62-102300

[51] Int. Cl.$^5$ .......................... G05D 23/00; F01P 7/02
[52] U.S. Cl. .................................. 236/93 R; 236/34.5
[58] Field of Search ..................... 236/93 R, 93 B, 34.5

[56] References Cited

U.S. PATENT DOCUMENTS

| | | | |
|---|---|---|---|
| 2,079,869 | 5/1937 | Peo | 236/93 R |
| 2,373,324 | 4/1945 | Martin | 236/93 R |
| 3,295,759 | 1/1967 | Wing | 236/93 R |
| 4,726,452 | 2/1988 | Ty et al. | 236/93 R X |

FOREIGN PATENT DOCUMENTS 1043591 11/1958 Fed. Rep. of Germany ........ 236/93

*Primary Examiner*—Harry B. Tanner
*Attorney, Agent, or Firm*—Armstrong, Nikaido Marmelstein Kubovcik & Murray

[57] ABSTRACT

A flow controller of a temperature-sensitive type provided with an initial condition setting mechanism comprises a valve; a valve seat; a bimetal support tube disposed around the valve and adapted to be rotated and angularly positioned by operating means; a bimetal wound between the valve and the bimetal support tube, and having ends fixed to the valve and the bimetal support tube, respectively; and a liquid passage formed through the valve and connected to a space in which the bimetal is disposed. The valve includes a closing portion which has a passage port and the valve seat includes a port adapted to face to the closing portion including the port, so that the relative position between the ports changes for automatically control the flow by virtue of the rotation of the valve caused by deformation of the bimetal in accordance with the change of the liquid temperature.

1 Claim, 6 Drawing Sheets

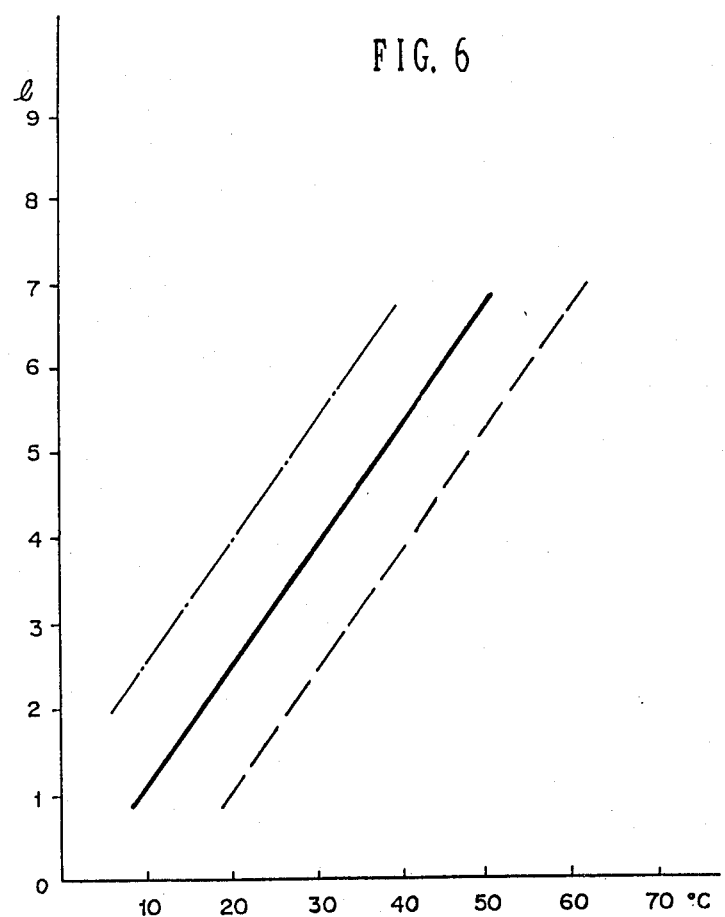

FLOW CONTROLLER

This application is a continuation of application Ser. No. 184,684 filed Apr. 22, 1988, abandoned.

FIELD OF THE INVENTION

The present invention relates to a temperature-sensitive flow controller provided with an initial condition setting mechanism, and more particularly, to a flow controller wherein initial conditions of flow can be initially set and the flow can be automatically controlled in accordance with the temperature thereof by means of a temperature-sensitive element incorporated therein. The invention can be appropriately used in cooling water passages in engines for automatically controlling the flow in accordance with the temperature of the cooling water in the engine.

BACKGROUND OF THE INVENTION

Conventionally, flow control in accordance with the temperature of the liquid is generally performed by a valve mechanism controlled by electric signals from temperature sensors, or by a pressure tube in which special liquid is filled for transmitting an expansion force or contraction force thereof to a valve mechanism.

However, if those methods are applied to lines for a very small flow formed by pipes having relatively small daimaters, there is unbalance in sizes between the pipes and a controller, resulting in disadvantages in spaces and manufacturing costs.

Such controlling devices have been already developed that initial conditions can be initially set and the initially set conditions or characteristics can be shifted in accordance with the temperature of liquid. These devices have however several problems such as complicated structures and thus high manufacturing costs.

Accordingly, it is an object of the present invention to provide a controller, overcoming the above-noted disadvantages, in which initial conditions can be facilely set, temperature-flow control characteristics based on the initial conditions can be shifted, and the structures are simple, compact, and thus, inexpensive.

SUMMARY OF THE INVENTION

According to the invention, a flow controller of a temperature-sensitive type provided with a initial condition setting mechanism comprises a valve; a valve seat associated to said valve; a bimetal support tube disposed around said valve and adapted to be rotated and angularly positioned by operating means; a bimetal wound between said valve and said bimetal support tube, and having ends fixed to said valve and said bimetal support tube, respectively; and a liquid passage formed through said valve and connected to a space in which said bimetal is disposed.

Said valve includes a closing portion at the downstream end thereof which has a passage port and said valve seat includes a port adapted to face to said closing portion including said port, so that the relative position between said ports in the valve and said valve seat changes for automatically control the flow by virtue of the rotation of said valve caused by deformation of said bimetal in accordance with the change of the liquid temperature, and that an initial flow corresponding to a predetermined temperature is set in accordance with the position to which said valve is rotated and positioned by said operating means.

In an embodiment, said valve and said bimetal support tube are fixed between upstream and down stream covers, and an adjustment bolt for rotating said bimetal support tube is supported by said upstream cover and is fixed to a gear, which meshes with a gear fixed to said bimetal support tube. Said bimetal support tube may provided with a groove, with which an external operating means is adapted to engage for rotating said bimetal support tube.

The invention will be described more in details in accordance with the embodiments illustrated in the accompanying drawings. However, the present invention is not limited to the illustrated embodiments.

BRIEF DESCRIPTION OF THE DRAWINGS

FIG. 6 is a graph illustrating a relationship between a temperature and a flow;

DETAILED DESCRIPTION OF THE PREFERRED EMBODIMENT

Figure 1A:
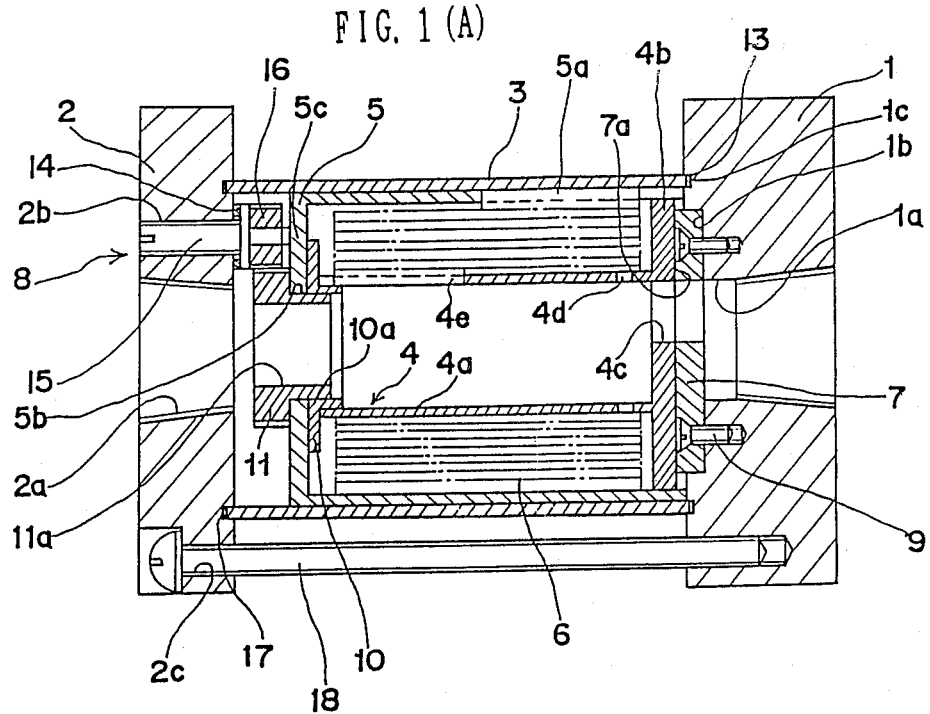
FIG. 1(A) is a sectional view of a controller of an embodiment of the invention.
Figure 1B:
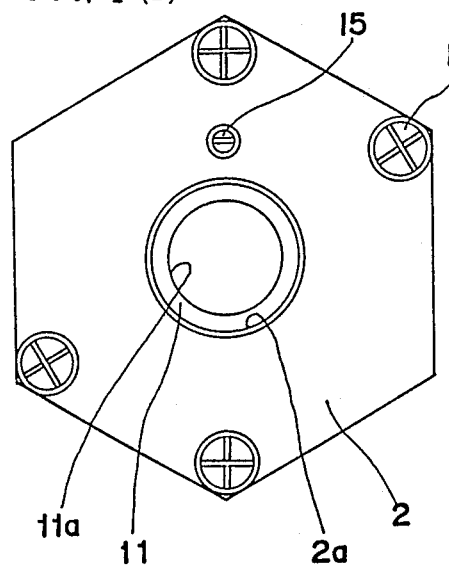
FIG. 1(B) is a left side view of the controller in FIG. 1(A)
Figure 1C:
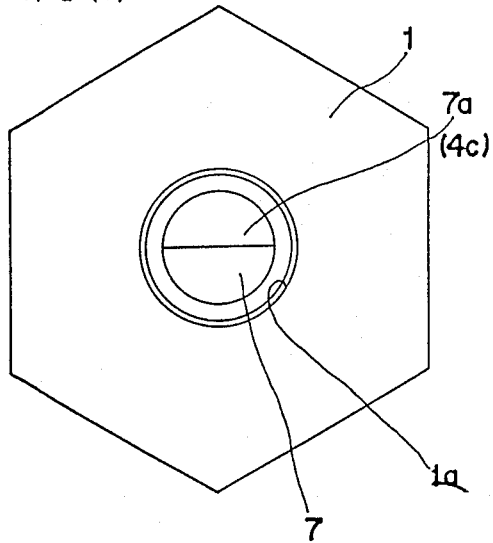
FIG. 1(C) is a right side view of the controller in FIG. 1(A)

Referring to FIG. 1 a controller of the first embodiment comprises covers 1 and 2 which are disposed at downstream and upstream sides (i.e., discharge and supply sides) of the controller, respectively, and are adapted to connect to pipe lines (not shown) A casing 3 is fixed between the covers 1 and 2. A valve 4 is disposed in the casing 3. A bimetal support tube 5 is disposed around the valve 4 and is fitted into the casing 3. A bimetal 6 is disposed between the tube 5 and the valve 4. A valve seat 7 is rested on a downstream end surface of the valve 4. The controller also includes an initial condition setting mechanism 8.

The downstream cover is provided at the center thereof with a circular opening or port 1a, and is provided at the inner side with a hollow 1b, to which the valve seat 7 is fitted. In an assembling operation, the cover 1 is first fixed to the pipe (not shown). The valve seat 7 is fitted into the hollow 1b and is fixed thereto by flat head screws 9. The valve seat 7 is provided with a passage port 7a of a half-circular shape, which is concentric with said port 1a and has a diameter same as that of the port 1a. Thus, a half-circular portion of the port 1a in the cover 1 is closed by the valve seat 7.

Figure 2:
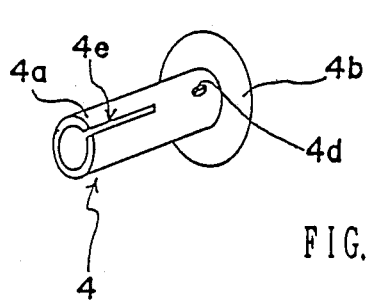
FIG. 2 is a perspective view of a valve.
Figure 3:
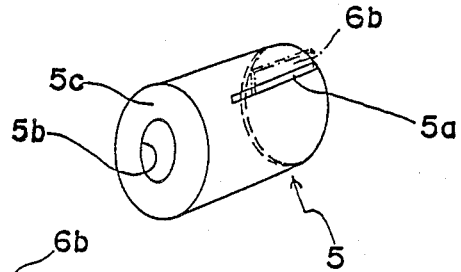
FIG. 3 is a perspective view of a bimetal support tube.
Figure 4:
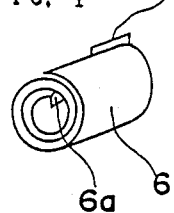
FIG. 4 is a perspective view of a bimetal.

The valve 4 includes, as shown in FIG. 2, a cylindrical portion 4a and a closing portion 4b at an end of the portion 4a. The closing portion 4b is adapted to contact the inner surface of the valve seat 7 and has an opening or passage port 4c, through which the liquid flows to the ports 7a and 1a in the valve seat 7 and the cover 1. The cylindrical portion 4a of the valve 4 is provided at the vicinity of the closing portion 4b with passage apertures 4d and is also provided with a bimetal engagement groove 4e axially entending from the end opposite to the closing portion 4b. The bimetal support tube 5 is, as shown in FIG. 3, provided with a bimetal engagement groove 5a axially extending from an end thereof and a closing portion 5c located at the other end. The portion 5c includes a central port 5b. The bimetal 6 arranged between the bimetal support tube 5 and the valve 4 has, as shown in FIG. 4, bent engagement portions 6a and 6b at opposite ends. In the assembling operation, the bent engagement portion 6a is fixedly inserted into the bimetal engagement groove 4e in the valve 4, the bimetal 6 is then wound around the valve 4, and the other bent engagement portion 6b is fixedly inserted into the bimetal engagement groove 5a in the bimetal support tube 5 after a spacer 10 is inserted at the upstream end of the valve 4. In the illustrated embodiment, the bimetal 6 is in a range between 20 mm and 30 mm in width and is wound ten times. The spacer 10 has a central port 10a connecting to the central port 5c in the upstream closing portion 5b of the bimetal support tube 5. The ports 10a and 5b are in concentrical relationship to each other end have a substantially same diameter. The ports 10a and 5b connect to a central port 11a formed in a gear 11, which is fixed by adhesive to the outer surface of the closing portion 5c of the tube 5.

In the assembling operation, as described above, the bimetal 6 is attached between the valve 4 and the bimetal support tube 5, the bimetal support tube 5 is inserted along the inner peripheral surface of the casing 3 together with the spacer 10 and the gear 11 held at appropriate positions, and then, the end of the casing 3 is fixedly fitted to the engagement groove 1c in the downstream cover 1 with a packing 13 therebetween.

The upstream cover 2 has a central opening or passage port 2a, an aperture 2b for an adjustment bolt and apertures 2c for fixing bolts. The adjustment bolt 15 is inserted from the interior side of the controller into the aperture 2b with a packing 14 between the head thereof and the cover 2, and a gear 16 is fixed to the adjustment bolt 15 by adhesive. After setting the bolt 15 and the gear 16, as described above, the casing 3 is fixedly fitted to the cover 2 with a packing 17 therebetween, whereby, the gears 11 and 16 meshes with each other in the casing 3, and then, the cover 2 is fixed to the cover 1 by bolts 18 inserted through the apertures 2c.

In the controller described above, the rotation of the valve 4 effects the change of the relative positions (i.e., overlapping condition) of the port 4c in the closing portion of the valve 4 and the port 7a in the valve seat 7, so that the effective open area of the port 7a changes to control and adjust the flow. The initial flow is set by the adjustment bolt 15. After the flow is introduced, the bimetal 6 (heat-sensitive element) acts to rotate the valve 4 in accordance with the temperature of the liquid to adjust the flow. When the adjustment bolt 15 is turned in the initial stage, i.e., before introducing the liquid, the gear 16 as well as the gear 11 meshing with it, the bimetal support tube 5 fixed to the gear 11 and the valve 4 rotate, so that the port 4c moves and changes the position thereof relative to the port 7a in the valve seat, and thus, the effective open area of the port 7a is set at a predetermined value. In the illustrated embodiment, the end surface of the adjustment bolt 15 is in contact with the bimetal support tube 5, so that the bolt 15 is prevented from freely and undesirably rotating.

In the illustrated controller, a part of the liquid introduced into the cylindrical portion 4a of the valve 4 flows through the upstream bimetal engagement groove 4e into the space between the spiral bimetal 6, returns through the downstream aperture 4d into the cylindrical portion 4a, and then, flows out though the ports 7a and 1a. In this operation, the bimetal 6 deforms in accordance with the temperature of the liquid flowing along it, which causes the rotation of the valve 4. The structures described above are appropriately determined so that when the temperature of the liquid increases, the effective open area, i.e., the overlapping area, of the ports 4c and 7a increases to increase the flow, and when the temperature of the liquid decreases, the effective open area decreases to reduce the flow. Further, the position of the terminating end of the bimetal 6 can be adjusted in the assembling operation to adjust the effective open area, i.e., flow, corresponding to the temperature.

Figure 5:
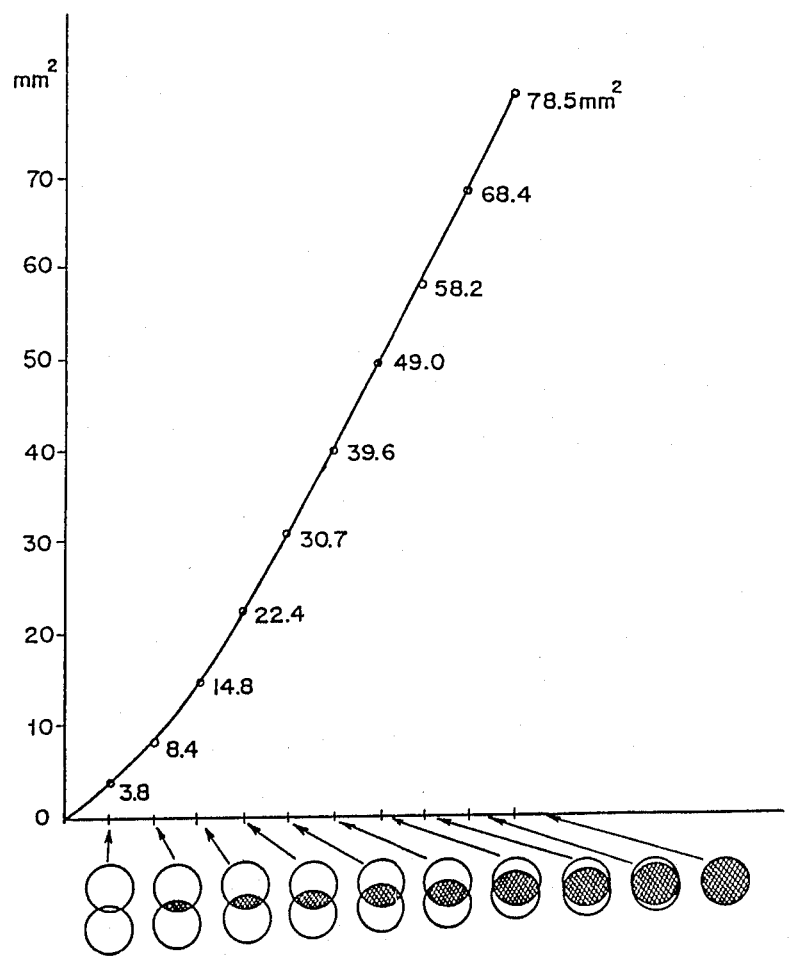
FIG. 5 is a graph illustrating a relationship between overlapping conditions of ports and overlapping area.

In the controller illustrated in FIG. 1, the valve 4 and the valve seat 7 have the half-circular ports, respectively. They may however have openings of various shapes. For example, the vale 4 and the valve seat 7 may have eccentrically located completely circular small ports. FIG. 5 illustrates a relationship between the overlapping conditions and the overlapping area (effective open area) in the structures including said completely circular small openings having diameters of 10 mm, respectively.

FIG. 6 illustrates a relationship between the flow corresponding to the effective open area and the temperature. As illustrated therein, the temperature-flow characteristics can be shifted, as indicated by solid, dotted and image lines, in accordance with the initially set conditions.

Figure 7:
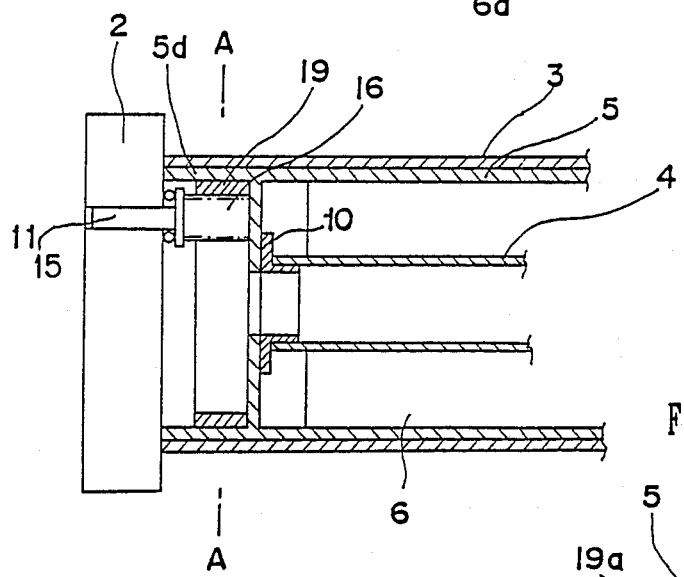
FIG. 7(A) is a fragmentary sectional view of a second embodiment of the invention.
FIG. 7(B) is a sectional view taken along the line A—A in FIG. 7(A)
Figure 7:
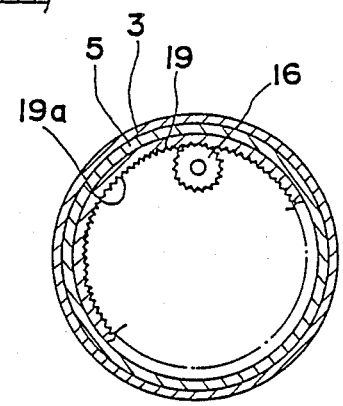

FIG. 7 illustrates a second embodiment of the initial condition setting mechanism. Although the first embodiment described above includes the gear 11 concentrically fixed to the bimetal support tube 5, in the second embodiment, it is replaced by structures in which the bimetal support tube 5 is provided at the upstream end with an annular projection 5d of which inner peripheral surface fixedly supports a ring gear 19, having internal teeth 19a, and the gear 16 fixed to the adjustment bolt 15 meshes with the gear 19. In these structures, the rotation of the adjustment bolt 15 causes the rotation of the bimetal support tube 5 through the gears 16 and 19, so that the valve 4 is rotated for initially setting the effective open area.

Figure 8:
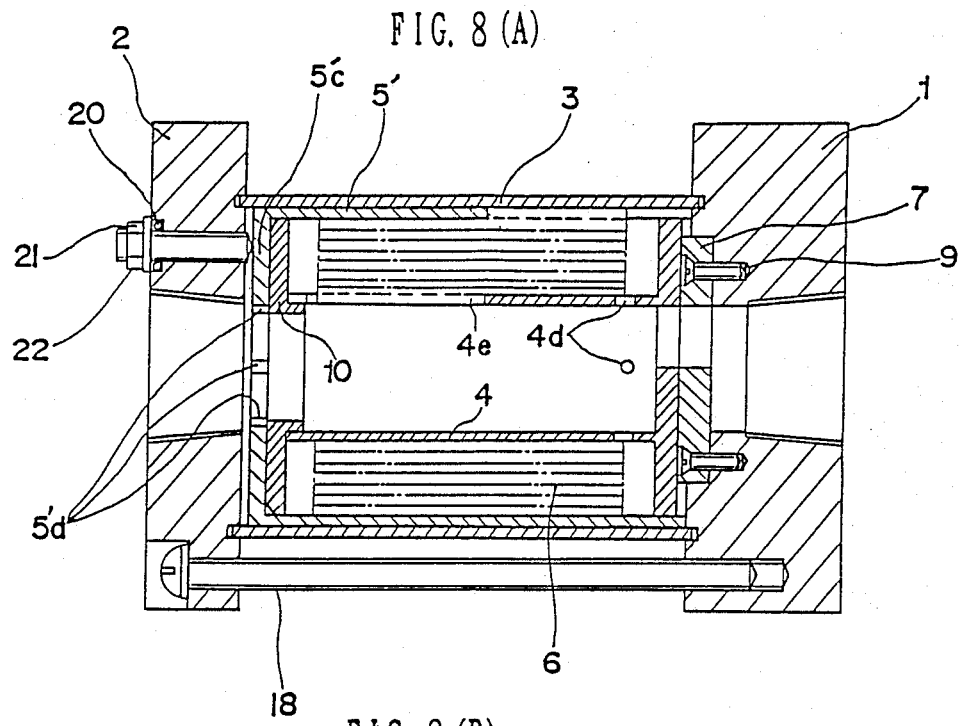
FIG. 8(A) is a sectional view of a third embodiment.
FIG. 8(B) is a left side view of the embodiment in FIG. 8(A)
Figure 8:
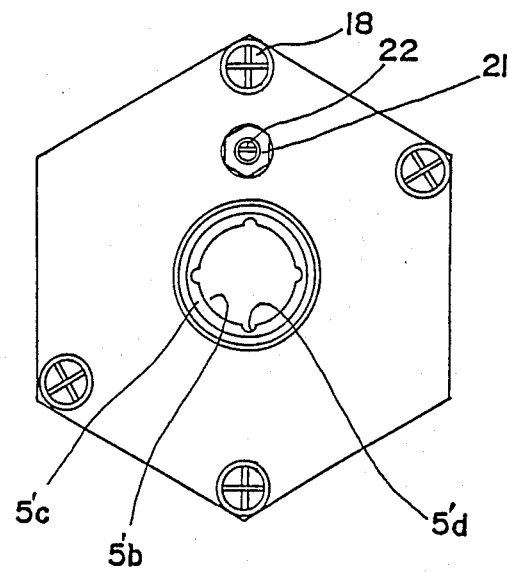

FIG. 8 illustrates a third embodiment of the initial condition setting mechanism having simple structures. The upstream closing portion 5'c of the tube 5' is provided at the periphery of the central port 5'b with circumferentially equally spaced four engagement grooves 5'd adapted to engage with external rotating or operating means (not shown). In the assembling operation of this third embodiment, The bimetal 6 is arranged between the valve 4 and the bimetal support tube 5', the tube 5' to which the spacer 10 is associated is then inserted into the casing 3, and then, the casing 3 is fitted and fixed by the bolts 18 to the covers 1 and 2 with packings therebetween. After this assembly, a bolt 22 is screwed into the upstream cover 2 to until the head thereof contacts the tube 5' for pushing and fixing the bimetal support tube 5' toward the downstream cover 1. Then, a packing 20 and a nut 21 are attached to the bolt 22 to prevent the rotation thereof.

In setting operation of the initial condition in this controller, after the fixing bolt 22 is released, the external rotating means is engaged from the upstream cover side with the engagement grooves 5'd in the tube 5'. An operator operates the rotating means to rotate the bimetal support tube 5' to an appropriate position while watching the relative position between the valve 4 and the valve seat 7. Thereafter, the fixing bolt 22 is fastened to fix the bimetal support tube 5'. The structures and operation, except for those described above, are same as or similar to those in said first embodiment, and thus, are not described herein.

Figure 9:
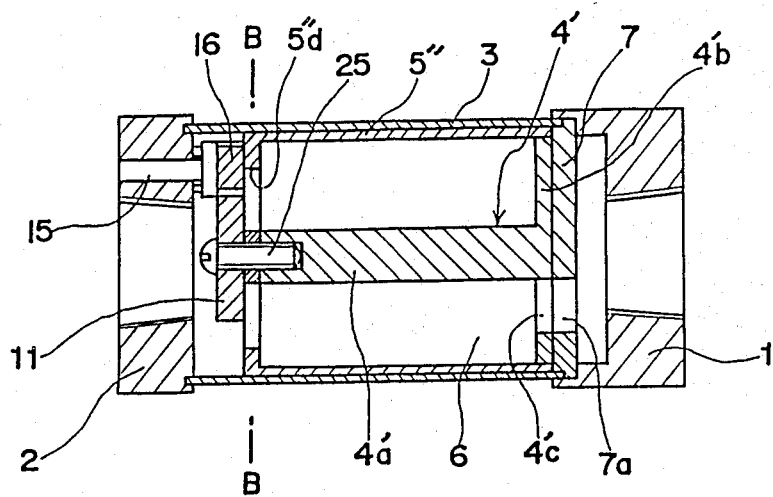
FIG. 9(A) is a sectional view of a fourth embodiment of the invention.
FIG. 9(B) is a sectional view taken along the line B—B in FIG. 9.
FIG. 9(C) is a left side view of the embodiment in FIG. 9(A).
Figure 9:
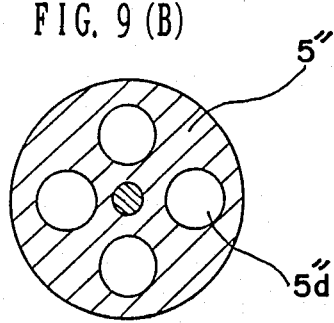
Figure 9:
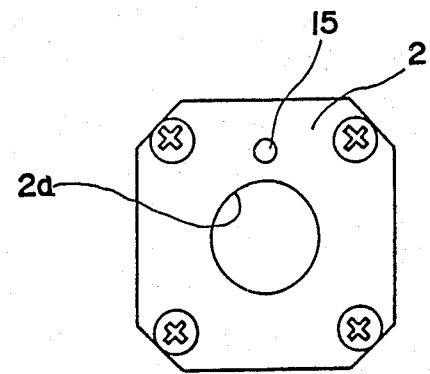

Referring to FIG. 9 illustrating a fourth embodiment of the invention, the liquid passage in the controller, which is formed inside the valve in the embodiments already described, is formed between the valve and the bimetal support tube. The valve 4' are made of solid column or rod having a circular section and a small diameter, and integrally has a circular flange at the downstream end which forms the passage closing portion 4'b provided with the port 4'c. On the other hand, the upstream closing portion 5"c of the bimetal support tube 5" has, as shown in FIG. 9(B), circumferentially equally spaced four ports 5"d for the liquid passage. Therefore, the whole liquid introduced through the upstream cover 2 flows through the port 5"d into the space between the valve 4' and the tube 5". In this manner, since the whole liquid flows through the space in which the bimetal 6 is disposed, the bimetal 6 rapidly reacts to the temperature of the liquid, and thus, quickly controls the flow. The principal of initial condition setting mechanism in this embodiment is same as or similar to that in the first embodiment. In this mechanism, the gear 11' is fixed by a bolt 25 to the center of the closing portion of the bimetal support tube 5". The gear 11 meshes with the gear 16 fixed to the adjustment bolt 15, so that the bolt 15 can rotate the valve 4' through the gears 16 and 11', the tube 5" and the bimetal 6. A bolt 25 fixing the gear 11" to the bimetal support tube 5" is rotatably fitted into the center shaft or rod 4a of the valve 4 for allowing the rotation of the valve 4' relative to the bolt 25. Other structures and operation are substantially same as or similar to those in the embodiment already described above, and thus, is not specifically described herein.

Although not illustrated in the drawings, the controller according to the invention may be modified as follows. That is; it may be provided with two valves having ports for the liquid passage which are faced to each other. Each valve is adapted to be rotated by a bimetal fixed thereto in accordance with the temperature. The initial condition can be set by rotating one or both of bimetal support tubes. These two valves may be constructed to rotate in the opposite directions in accordance with the change of the liquid temperature as well as a manual operation for setting the initial conditions. In this case, the opening degree of the assembled valves changes rapidly (i.e.. twice) as compared with the degree of the change in the illustrated embodiment, so that the flow can be changed to a large extent. Therefore the valve can have smaller diameter, resulting in further compact structures.

In the controller, the valve seat may be exchanged for that having a port of different size and/or shape for changing the temperature-flow characteristics.

According to the invention, as described hereinbefore, the initial flow can be facilely set only by rotating the adjustment bolt, the flow can be automatically controlled in accordance with the liquid temperature by the heat-sensitive element constituted of the incorporated bimetal, and the temperature-flow characteristics can be shifted by changing the initially set condition. Further, by changing the shapes and/or sizes of the ports for the liquid passage in the valve and the valve seat, the intended relationship between the flow and the temperature can be freely set, so that the controller can be applied to various uses. Further, the controller according to the invention has simple structures and small configurations, and thus, can be remarkably compact as compared with the conventional controller. Therefore it can be attached to pipes having relatively small diameters without practical problems. There is also advantage that the manufacturing cost can be reduced.

While the invention has been particularly shown and described in reference to preferred embodiments thereof, it will be understood by those skilled in the art that changes in form and detail may be made therein without departing from the spirit and scope of the invention.

What is claimed is:

1. A flow controller of a temperature-sensitive type provided with an initial condition setting mechanism, comprising:
    a valve;
    a valve seat associated with said valve;
    a bimetal support tube disposed around said valve;
    a bimetal member wound in overlapping manner between said valve and said bimetal support tube, and having an end directly coupled to said valve and an opposing end directly coupled to said bimetal support tube; and
    a liquid passage formed through said valve and connected to a space in which said bimetal is disposed,
    wherein said valve comprises a closing portion at the downstream end thereof which has a passage port, and said valve seat comprises a port adapted to face toward said closing portion including said port, so that the relative position between said ports in the valve and said valve seat changes for automatic control of the liquid flow by virtue of the rotation of said valve caused by deformation of said bimetal member in accordance with the change of the liquid temperature, and wherein an initial flow corresponding to a predetermined temperature is set in accordance with an initial position of said valve, and
    wherein said valve and said bimetal support tube are fixed between upstream and downstream covers, and an adjustment bolt to rotating said bimetal support tube is supported by said upstream cover and is fixed to a first gear which meshes with a second gear fixed to said bimetal support tube.

* * * * *